US012024978B2

(12) United States Patent
McKim et al.

(10) Patent No.: US 12,024,978 B2
(45) Date of Patent: Jul. 2, 2024

(54) MULTI REEL SYSTEM

(71) Applicant: GJR Meyer Service, Inc., Corpus Christi, TX (US)

(72) Inventors: Noel McKim, Corpus Christi, TX (US); Randy Scott Meyer, Alice, TX (US)

(73) Assignee: GJR Meyer Service, Inc., Corpus Christi, TX (US)

( * ) Notice: Subject to any disclaimer, the term of this patent is extended or adjusted under 35 U.S.C. 154(b) by 486 days.

(21) Appl. No.: 16/128,238

(22) Filed: Sep. 11, 2018

(65) Prior Publication Data

US 2019/0360636 A1 Nov. 28, 2019

Related U.S. Application Data

(60) Provisional application No. 62/676,830, filed on May 25, 2018.

(51) Int. Cl.
*E21B 34/02* (2006.01)
*E21B 41/00* (2006.01)
(Continued)

(52) U.S. Cl.
CPC .............. *E21B 34/02* (2013.01); *E21B 41/00* (2013.01); *E21B 43/2607* (2020.05); *F16N 29/02* (2013.01)

(58) Field of Classification Search
CPC ...................................................... F16N 29/02
See application file for complete search history.

(56) References Cited

U.S. PATENT DOCUMENTS 5,823,295 A * 10/1998 Griffith ................... F16N 29/02
184/6.4
2005/0184084 A1* 8/2005 Wells ..................... B67D 7/348
222/1

(Continued)

*Primary Examiner* — Michael R Mansen
*Assistant Examiner* — Mark K Buse
(74) *Attorney, Agent, or Firm* — Ramey LLP (57) ABSTRACT

A system for lubricating multiple frac valves while allowing the operator to remain out of the red zone. A system of high flow mandrels and valves allows an operator to enter the red zone a minimal number of times. Generally, when using the system, the operator will enter the red zone prior to the fracking operation beginning to connect the various lines to each frac valve and then after the frac job is complete to disconnect the various lines from each frac valve. A high-pressure pump provides lubricant at a sufficient pressure and volume to a high-pressure manifold or high-pressure manifolds. The high-pressure manifolds supply the hose reels through valves located near the manifold. The hose reels in turn are the lines that are connected to each frac valve Using the system, the operator may remain outside of the red zone with the lubricant reservoir, the pump, the high-pressure manifolds, and the hose reels. When a well pad is shut down the operator chooses which frac valve to grease and commands the associated valve on the high-pressure manifold to open. The high-pressure pump is then actuated using the lubricant from the lubricant reservoir the pump increases the lubricant pressure to about 15,000 psi supplying it to at least a first high-pressure manifold. The high-pressure manifold then distributes the lubricant through the open valve to the desired hose reel and then to the frac valve which is inside the red zone. The operator repeats the process until each of the frac valves on the well pad are greased. The various fittings, lines, valves, and manifolds are chosen or manufactured to minimize pressure losses through the system between the high-pressure pump and the frac valve.

10 Claims, 5 Drawing Sheets

(51) Int. Cl.
*E21B 43/26* (2006.01)
*F16N 29/02* (2006.01)

(56) References Cited

U.S. PATENT DOCUMENTS

| | | | |
|---|---|---|---|
| 2009/0200333 A1* | 8/2009 | Bauer | B60P 3/2265 |
| | | | 222/1 |
| 2013/0253855 A1* | 9/2013 | He | G01N 11/08 |
| | | | 702/50 |
| 2015/0345272 A1* | 12/2015 | Kajaria | E21B 47/00 |
| | | | 166/250.01 |
| 2017/0038003 A1* | 2/2017 | Conley | F16N 29/02 |
| 2017/0114957 A1* | 4/2017 | Conley | F16N 7/385 |
| 2017/0146189 A1* | 5/2017 | Herman | F16N 21/00 |
| 2019/0264869 A1* | 8/2019 | McKim | E21B 34/02 |
| 2019/0360636 A1* | 11/2019 | McKim | E21B 4/003 |
| 2019/0360637 A1* | 11/2019 | McKim | F16N 13/22 |
| 2020/0347990 A1* | 11/2020 | McKim | F16N 29/02 |

* cited by examiner

MULTI REEL SYSTEM

CROSS-REFERENCE TO RELATED APPLICATIONS

This application claims priority to U.S. Provisional Patent Application No. 62/676,830 that was filed on May 25, 2018, U.S. Provisional Patent Application No. 62/311,879 that was filed on Mar. 26, 2016 and U.S. patent application Ser. No. 15/466,694 that was filed on Mar. 22, 2017.

BACKGROUND

During a hydraulic fracturing operation, the fracturing assembly typically utilizes a number of valves each of which must be periodically greased. At the same time each of the valves are typically located within what is euphemistically referred to as the "red zone." The red zone is the area near the well where extremely high-pressure fluids are being pumped while at the same time because they are near a hydrocarbon well there is the possibility of explosive vapors being in the area or toxic vapors such as hydrogen sulfide being in the area. Therefore, in order to minimize the hazard to personnel the frac system is deenergized to reduce the pressure within the system so that personnel may enter the red zone and connect high-pressure hoses to each valve so that in turn each of the valves may be greased.

In order to grease each valve, the operator carries a high-pressure lubrication line to the wellhead and then connects the lubrication line to the first valve to be greased. The operator then leaves the red zone and begins pumping grease through the lubrication line and into the valve. Generally, the operator counts the number of strokes of lubrication pump in order to determine how much grease has been pumped into the particular valve. Once a sufficient amount of grease has been pumped into a valve the operator turns off the pump, walks back into the red zone, disconnects the lubrication line from the first valve, moves to the next valve, connects the lubrication line to the next valve, again leaves the red zone, and reactivates the lubrication pump. The process is repeated until each valve is greased. Lubricating all the valves for a single fracking operation may take as long as an hour and requires the operator to move in and out of the red zone and in some instances climb ladders or scaffolding to access hard-to-reach valves.

In order to overcome these obstacles some operators have attempted to plumb together multiple lines using various fittings such as T fittings, etc. however the internal fluid flow characteristics through such contraptions led to extreme pressure input requirements that were beyond the capability of most lubrication pumps with very poor pressure and volume output on the far end of the lubrication line. Many such systems had backpressure of about 11,000 pounds per square inch or psi.

SUMMARY

It has been found that maintaining an internal diameter of at least 0.25 inches to as much as 0.7 inches, but preferably 0.359 inches, through all connections, valves, and fittings allows the high-pressure pump to allow a sufficient quantity of lubricant to the frac valves. Such a system has a backpressure of less than 4000 psi. Additionally, the internal bore of the primary and high-pressure mandrels should be between 0.75 and 1.5 but more preferably about 1.0 inches to allow a sufficient quantity of lubricant to the frac valves.

In an embodiment of the current invention a device and method are envisioned to enhance the safety in the vicinity of a wellsite fracking operation by minimizing the time that personnel spend within the red zone while at the same time increasing the efficiency of the fracking operation by decreasing the amount of time required to grease each of the valves utilized during the fracking operation.

In a typical fracking operation, a well pad has three wells all of which will be fraced during the same operation. Using the current embodiment of the present invention a high-pressure lubrication hose is attached to each valve which is part of the fracking assembly and requires periodic greasing. Generally, the hoses are on reels which are mounted on a frame. In turn the hoses are connected to a first high-pressure manifold. Generally, a valve to control the flow of lubricant to the hose is located between the first high pressure manifold and the lubrication hose. The valve may be manually, hydraulically, pneumatically, or electrically operated. In turn the high-pressure manifold is connected to a primary manifold. The primary manifold is connected directly to a high-pressure lubricant pump, capable of pumping a fluid, typically grease, having a kinematic viscosity at 40 C of between 150 to 1600 centistokes, while increasing the fluid pressure to between 5000 and 20,000 PSI. The primary manifold has multiple outlets each configured to supply grease at both a sufficient quantity and pressure to the valve at the end of the supply chain. Additionally, each outlet on the primary manifold has a valve that is able to interrupt the flow of grease past the outlet at maximum pump pressure.

The multi-reel system begins with a high-pressure lubricant pump that has an intake submerged within a supply of grease. Typically, the grease is supplied in 55-gallon barrels and the high-pressure lubricant pump is mounted on top of the barrel. Generally, the high-pressure lubricant pumps are pneumatic pumps therefore a diesel driven air pump supplies air to the high-pressure lubricant pump, usually at about 100 psi. Once actuated the high-pressure lubricant pump supplies grease to its output at about 15,000 psi, with a maximum of about 20,000 psi. The output of the high-pressure lubricant pump is in turn connected to the primary manifold. The primary manifold has an inlet, connected to the high-pressure lubricant pump, an internal bore, and at least two outlets. Generally, however the primary manifold has three outlets each of which is directed to a high-pressure manifold controlling grease flow to the valves on each of the wells on a three well pad. Additionally, the internal flow-paths of the primary manifold are configured to minimize fluid energy losses within the manifold, typically no more than a 10% pressure loss through the manifold. Each of the inlets and outlets of the primary manifold are about 0.359 of an inch in diameter and the internal bore of the primary manifold is about 1 inch in diameter. Each outlet of the primary manifold is in turn connected to a valve to interrupt the flow of grease past the outlet. Each valve is connected to a fluid line to allow grease to flow from the valve to an inlet in a high-pressure manifold. Generally, the high-pressure manifold has 10 outlets each of which includes a valve to interrupt the flow of grease past the outlet. Each valve in turn is connected to a lubricant line of sufficient length, strength, and fluid flow capacity to provide grease at sufficient pressure and quantity to grease each of the frac valves on a well. The system generally has a location to provide for storage of each lubricant line, preferably the lubricant line is stored on a hose-reel.

In practice the pumps, lubricant supply, high-pressure manifold, primary manifold, a flowmeter, and the lubricant valves are located outside of the red zone. When it's time to lubricate the frac valves the operator determines which of the three wells are off-line meaning that the high-pressure frac fluid is not being delivered to a particular well and that no other work is taking place on that particular well. The operator then determines which particular frac valve is to be lubricated. It is then determined which hose reel is connected to the particular frac valve and the lubricant line is connected to the frac valves, usually with a quick release/connect coupling. The valve at the high-pressure manifold that controls the flow of grease to the particular hose reel is actuated to allow fluid flow through the valve. Then the valve at the primary manifold that controls the flow of grease to the particular high-pressure manifold is actuated to allow fluid flow through the valve between the primary manifold and the high-pressure manifold. The high-pressure pump is actuated to supply grease at both the proper flow rate and pressure to the frac valve which is being lubricated. When the flowmeter indicates the proper amount of grease has been supplied to the frac valve the high-pressure pump is deactivated. The valve controlling the fluid flow between the high-pressure manifold and the hose reel is closed. It is then determined which hose reel is connected to the second frac valve to be lubricated then the valve at the high-pressure manifold that control the flow grease through the second hose reel connected to the second frac valve is actuated to allow fluid flow between the high-pressure manifold and the second frac valve. The high-pressure pump is then reactivated and the procedure is repeated until each of the frac valves on a particular well are greased. Once all the valves on a particular well are greased all of the valves between the hose reels, the high-pressure manifolds, the primary manifold, and the high-pressure pump are closed. Once the second well is shut down so that the frac valves may be greased a second valve on the primary manifold may be open to direct fluids to the second high-pressure manifold and once again the procedure is repeated until each of the frac valves on the second well are lubricated.

It is envisioned that once the system is connected to the desired frac valves that each operation may be accomplished from a central control panel. Such operations include providing pressurized air from an air source, actuating the high-pressure pump, monitoring or presetting the flow meter, and opening or closing the valves that control the flow of pressurized lubricant to the frac valves. The central control panel may be located adjacent to the multi reel system, it may be accessed via Bluetooth when near the multireel system or it may be remotely accessed via the internet, cellular or other radio protocols.

DETAILED DESCRIPTION

The description that follows includes exemplary apparatus, methods, techniques, or instruction sequences that embody techniques of the inventive subject matter. However, it is understood that the described embodiments may be practiced without these specific details.

Figure 1:
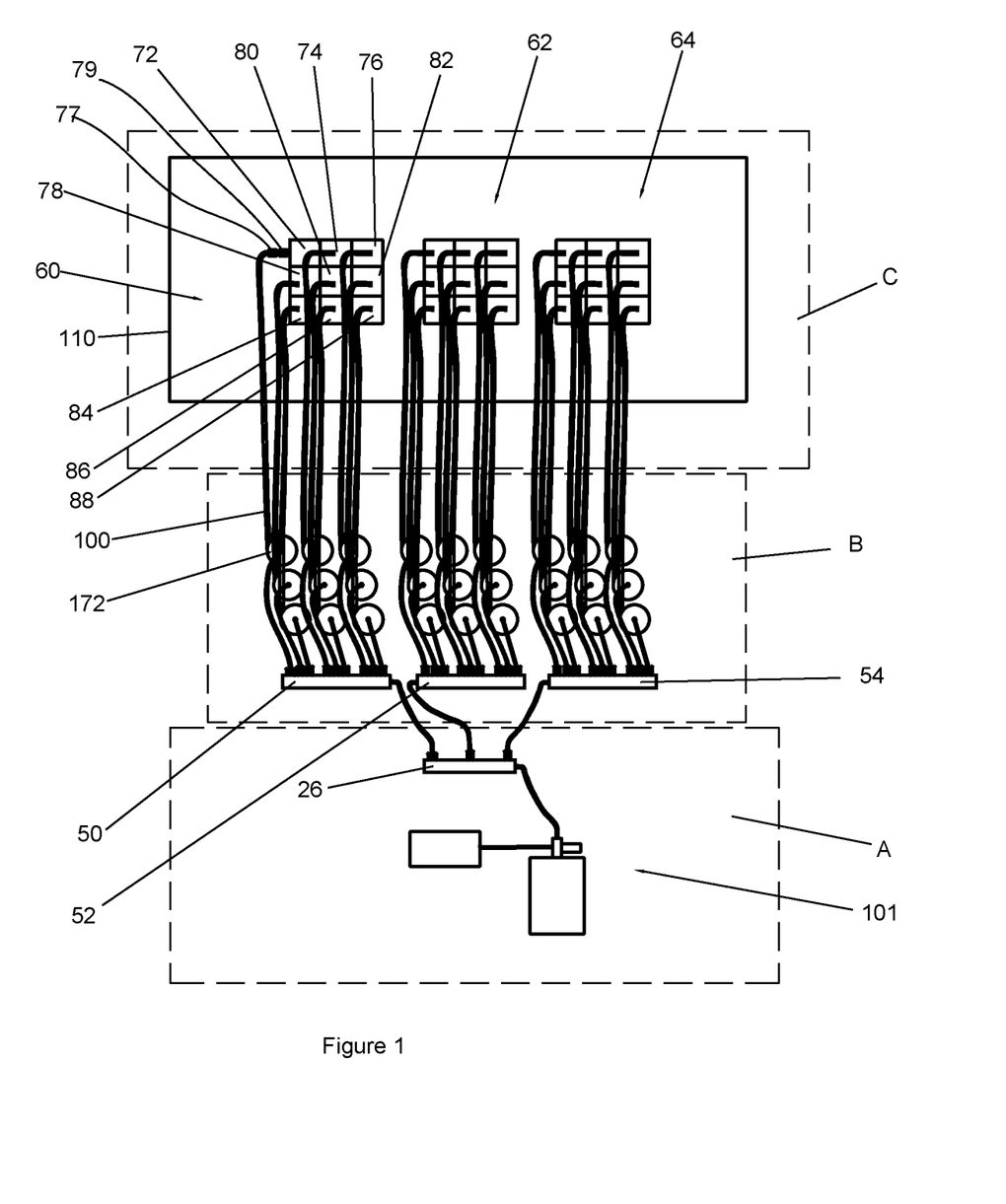
FIG. 1 depicts an embodiment of the multi reel system deployed on a three-well pad.

FIG. 1 depicts a system of the present embodiment deployed on a three-well pad. Area A includes generally the driving assembly 101 and the primary manifold 26. The valves 34, 38, and 42 control the flow path from the primary manifold 26 to a particular well pad 60, 62, or 64 through one of the high-pressure manifolds 50, 52, or 54. Area "B" depicts the primary distribution assembly and in the configuration shown includes three high-pressure manifolds 50, 52, and 54. In the configuration shown a single high-pressure manifold, such as high-pressure manifold 50 controls all lubricant flow to a single well pad, such as well pad 60. In practice due to variations in the number of valves on a well pad requiring lubricant during the fracking a high-pressure manifold having a higher number of ports and valves or multiple high-pressure manifolds may be utilized. Area "C" depicts a three well pad's 60, 62, and 64. Each of the well pads schematically depicts nine valves requiring lubrication. For instance, well pad 60 depicts frac valves 72, 74, 76, 78, 80, 82, 84, 86, and 88. Each of the frac valves 72-88 is connected to a hose reel in area B. For instance, hose reel 172 is connected to frac valve 72 via the high-pressure hose 100. Where high-pressure hose 100 is connected to frac valve 72 through quick connect coupling 77. A check valve 79 prevents backflow from the frac valves into the lubricant. Each of the well pads 60, 62, and 64 and the frac valves on each well pad are located within the red zone 110 with the high-pressure hoses connecting each valve to a hose reel passing from within the red zone to outside of the red zone. With the exception of the high-pressure hoses connecting each frac valve to a hose reel the distribution equipment from area be and the equipment located within area A all outside of the red zone.

Figure 2:
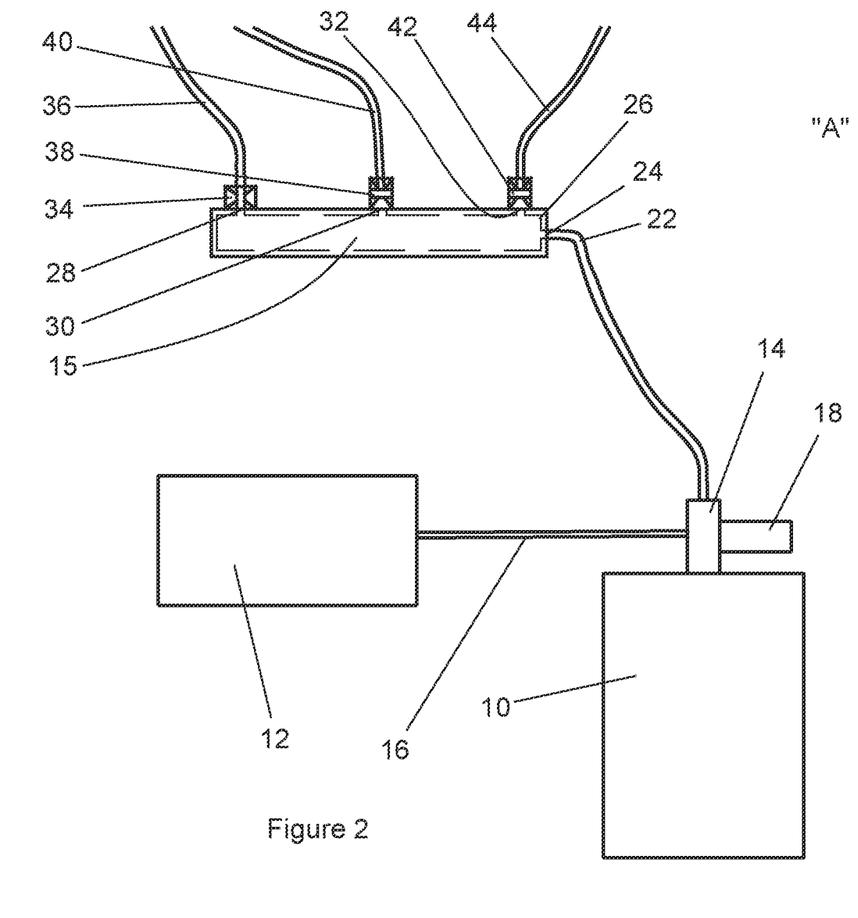
FIG. 2 depicts area "A" from FIG. 1.

FIG. 2 depicts area "A" from FIG. 1 which includes a lubricant reservoir 10 and an air source 12. The air source 12 is typically driven by a 15 hp diesel engine but any air source that is capable of providing a sufficient amount of air at 100 psi may be used. Generally, a sufficient amount of air may be supplied via compressor that can deliver at least 50 ft.$^3$ per minute at 175 psi. The lubricant reservoir 10 is generally a 55-gallon barrel. A high-pressure pump 14 is generally mounted on the lubricant reservoir 10 although the high-pressure pump 14 may be mounted anywhere as long as the high-pressure pump 14 inlet is supplied with lubricant. The high-pressure pump 14 is supplied with compressed gas, generally air, from air source 12 via line 16. Line 16 may be of any length but a short, less than 10 feet long, line is preferred in order to minimize pressure losses between the air source 12 and the high-pressure pump 14 as the compressed gas moves through the line 16. Generally, flow meter 18 is attached to high-pressure pump 14. In practice a sensor (not shown) is attached to high-pressure pump 14 with the flow meter display 18 mounted near the controls for the multi-real system. When the high-pressure pump 14 is actuated the high-pressure pump 14 will supply grease from lubricant reservoir 10 to line 22 at approximately 15,000 psi. In some instances, the high-pressure pump 14 may supply grease to line 22 in a range of from about 5000 psi to 20,000 psi, although 15,000 psi is preferred.

Line 22 is connected to inlet 24 of the primary manifold 26. High pressure grease flows from line 22 through inlet 24 in the primary manifold 26. In the configuration shown primary manifold 26 has a first port 28, a second 30, and a third port 32. First valve 34 is attached to primary manifold 26 and is fluidly connected to the interior primary manifold 26 via first port 28. First valve 34 is shown in its open configuration allowing fluid to flow between first valve 34 and first line 36. Second valve 38 is attached to primary manifold 26 and is fluidly connected to the interior of primary manifold 26 via second port 30. Second valve 36 is shown in its closed configuration preventing fluid from flowing between second valve 38 and second line 40. Third valve 42 is attached to primary manifold 26 and is fluidly connected to the interior of primary manifold 26 via third port 32. Third valve 42 is shown in its closed configuration preventing fluid from flowing between the third valve 42 and the third line 44. First line 36 is in turn attached to high-pressure manifold 50. The multi-reel system includes begins with a high-pressure pump 14 that has an intake submerged within a lubricant reservoir 10. Typically, the grease is supplied in 55-gallon barrels and the high-pressure pump 14 is mounted on top of the barrel or lubricant reservoir. Generally, the high-pressure pumps 14 are pneumatic pumps therefore a diesel driven air pump or air supply 12, supplies air to the high-pressure pump 14, usually at about 100 psi. Once actuated the high-pressure pump 14 supplies grease to its output at about 15,000 psi, with a maximum of about 20,000 psi. The output of the high-pressure pump 14 is in turn connected to the primary manifold 26. The primary manifold 26 has an inlet 24, connected to the high-pressure pump 14, an internal bore 15, and at least two outlets. Generally, however the primary manifold has three outlets 28, 30, and 32 each of which is directed to a high-pressure manifold, such as 50, 52, or 54 in FIG. 1, which in turn control grease flow to the valves on each of the wells on a three well pad. Additionally, the internal flowpath of the primary manifold 26 is configured to minimize fluid energy losses within the primary manifold, typically no more than a 10% pressure loss through the primary manifold. Each of the inlet 24 and outlets 28, 30, and 32 of the primary manifold 26 are preferably about 0.359 of an inch in diameter and the internal bore 15 of the primary manifold 26 is preferably about 1 inch in diameter. However, each of the inlet 24 and outlets 28, 30, and 32 of the primary manifold 26 may be between 0.25 inches and 0.7 inches in diameter and the internal bore 15 of the primary manifold 26 may be between 0.75 and 1.5 inches in diameter. Each outlet 28, 30, and 32 of the primary manifold 26 is in turn connected to a valve 34, 38, and 42 respectively, to interrupt the flow of grease past the outlets 28, 30, and 32 respectively. Each valve 34, 38, and 42 is connected to a fluid line 36, 40, and 44 to allow grease to flow from the valve 34, 38, and 42 to an inlet in a high-pressure manifold 50, 52, or 54 in FIG. 1.

Figure 3:
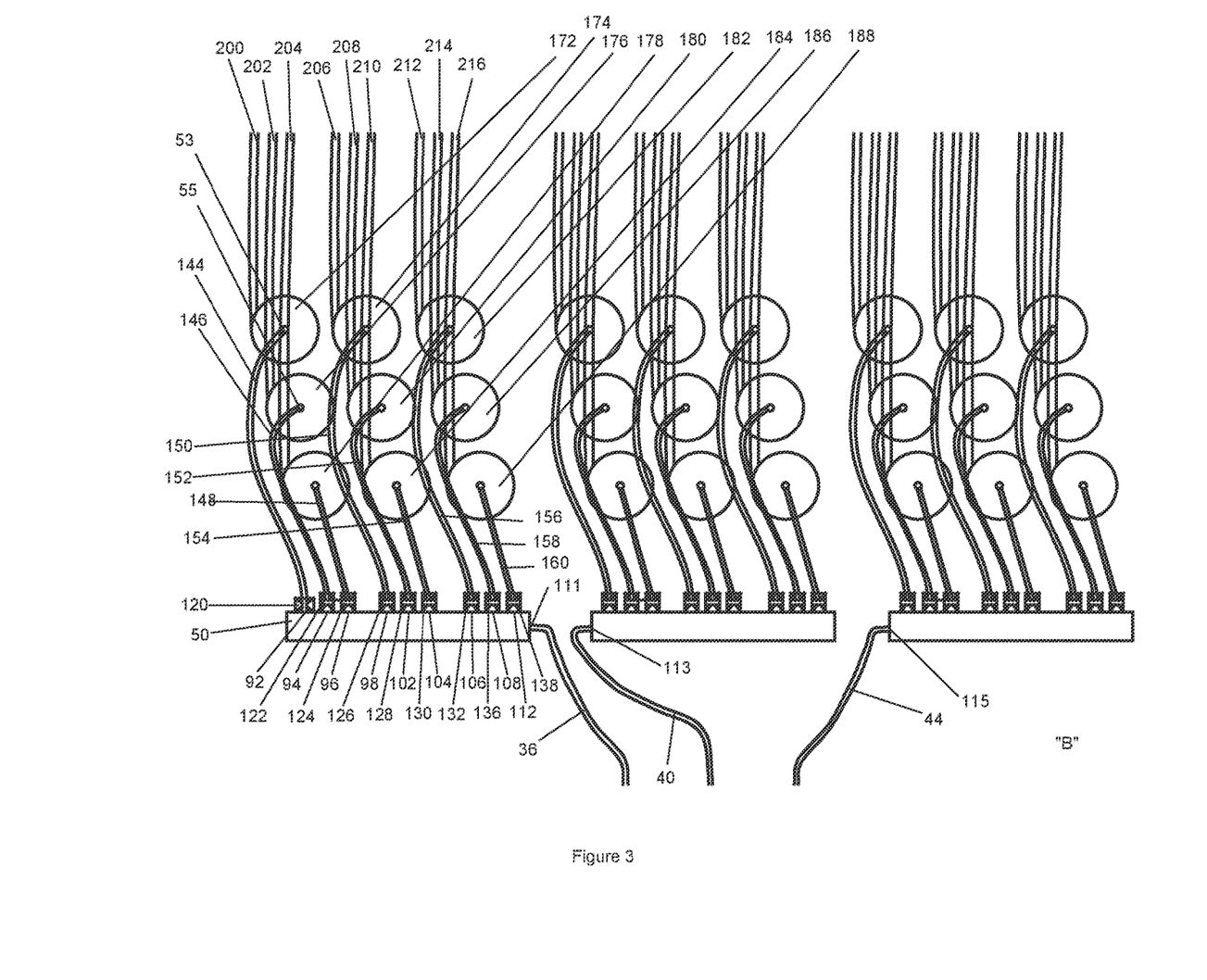
FIG. 3 depicts area "B" from FIG. 1.

FIG. 3 depicts area "B" from FIG. 1 which includes most of the distribution assembly. The high-pressure manifolds 52, 54, and 56 the valves 120, 122, 124, 126, 128, 130, 132, 134, 136, and 138, the hose reels 172, 174, 176, 178, 180, 182, 184, 186, and 188 as well as the hoses that and fitting to connect one to the other. High-pressure manifold 50 in the configuration shown has a fourth port 92, a fifth port 94, a sixth port 96, a seventh port 98, an eighth port 102, a ninth port 104, a tenth port 106, an eleventh port 108, and a twelfth port 112. Fourth valve 120 is attached to high-pressure manifold 52 and is fluidly connected to the interior of high-pressure manifold 52 via fourth port 92. Fourth valve 120 is shown in its open configuration allowing fluid flow between the interior of high-pressure manifold 52 through fourth valve 120 and into the fourth line 144. Fifth valve 122 is attached to high-pressure manifold 52 and is fluidly connected to the interior of high pressure manifold 52 via fifth port 94. Fifth valve 122 is shown in its closed configuration preventing fluid flowing between the interior of high-pressure manifold 52 through fifth valve 122 and into the fifth line 146. Sixth valve 124 is attached to high-pressure manifold 52 and is fluidly connected to the interior of high-pressure manifold 52 via sixth port 96. Sixth valve 124 is shown in its closed configuration preventing fluid flow between the interior of high-pressure manifold 52 through sixth valve 124 and into sixth line 148. Seventh valve 126 is attached to high-pressure manifold 52 and is fluidly connected to the interior of high-pressure manifold 52 via seventh port 98. Seventh valve 126 is shown in its closed configuration preventing fluid flow between the interior of high-pressure manifold 52 through seventh valve 126 and into seventh line 150. Eighth valve 128 is attached to high-pressure manifold 52 and is fluidly connected to the interior of high-pressure manifold 52 via eighth port 102. Eighth valve 128 is shown in its closed configuration preventing fluid flow between the interior of high-pressure manifold 52 through eighth valve 128 and into eighth line 152. Ninth valve 130 is attached to high-pressure manifold 52 and is fluidly connected to the interior of high-pressure manifold 52 via ninth port 104. Ninth valve 130 is shown in its closed configuration preventing fluid flow between the interior of high-pressure manifold 52 through ninth valve 130 and into ninth line 152. Tenth valve 132 is attached to high-pressure manifold 52 and is fluidly connected to the interior of high-pressure manifold 52 via tenth port 106. Tenth valve 132 is shown in its closed configuration preventing fluid flow between the interior of high-pressure manifold 52 through tenth valve 132 and into tenth line 154. Eleventh valve 136 is attached to high-pressure manifold 52 and is fluidly connected to the interior of high-pressure manifold 52 via eleventh port 108. Eleventh valve 136 is shown in its closed configuration preventing fluid flow between the interior of high-pressure manifold 52 through eleventh valve 136 and into eleventh line 156. Twelfth valve 138 is attached to high-pressure manifold 52 and is fluidly connected to the interior of high-pressure manifold 52 via twelfth port 112. Twelfth valve 138 is shown in its closed configuration preventing fluid flow between the interior of high-pressure manifold 52 through twelfth valve 138 and into twelfth line 158.

As indicated in FIG. 3, valve 120 is fluidly connected to hose reel 172 via fourth line 144. Fourth line 144 may be a hose, tubing or other fluid pathway. As previously indicated valve 120 is open allowing fluid to pass through valve 120 and into fourth line 144. Hose reel 172 includes an inlet 53. Inlet 53 is configured to allow grease or other fluids to flow from fourth line 144 and into hose reel 172. Generally, fourth line 144 remains relatively stationary while hose reel 172 may rotate. Valve 122 is fluidly connected to hose reel 174 via fifth line 146. Fifth line 146 may be a hose, tubing or other fluid pathway. As previously indicated valve 122 is closed preventing fluid from passing through valve 122 and into fifth line 146. Hose reel 174 includes an inlet 55. Inlet 55 is configured to allow grease or other fluids to flow from fifth line 146 and into hose reel 174. Generally, fifth line 146 remains relatively stationary while hose reel 174 may rotate. While the valves 122, 124, 126, 128, 130, 132, 136, and 138 attached to high-pressure manifold 50 are indicated as closed thereby preventing grease or other fluids from flowing through the valves in some circumstances, provided that a high-pressure pump or pumps may provide a sufficient quantity of grease, lubricant, or other fluid at the required pressure, multiple valves may be open at the same time.

FIG. 3 depicts area "C" from FIG. 1 which includes the red-zone, the well pads, and all of the frac valves. Shown is a red zone 110. The red zone 110 is typically the area near the well pad or the wellbore wells are being frac and includes most of the high-pressure fracking equipment and valves. In this instance only frac valves 72, 74, 76, 78, 80,

82, 84, 86, and 88 on well pad 60 are referenced. While well pad 62 and 64 are each shown with representations of frac valves on each well pad process procedures described with regard to well pad 60 are the same. In this instance with the high-pressure pump 14 actuated and valves 34 and 120 open while all other referenced valves are closed lubricant or grease will only flow through line 200 to frac valve 72. While in the present configuration no lubricant is allowed to flow through lines 202, 204, 206, 208, 210, 212, 214, and 216. Typically, a check valve prevents backflow from the frac valves into the lubricant.

Figure 5:
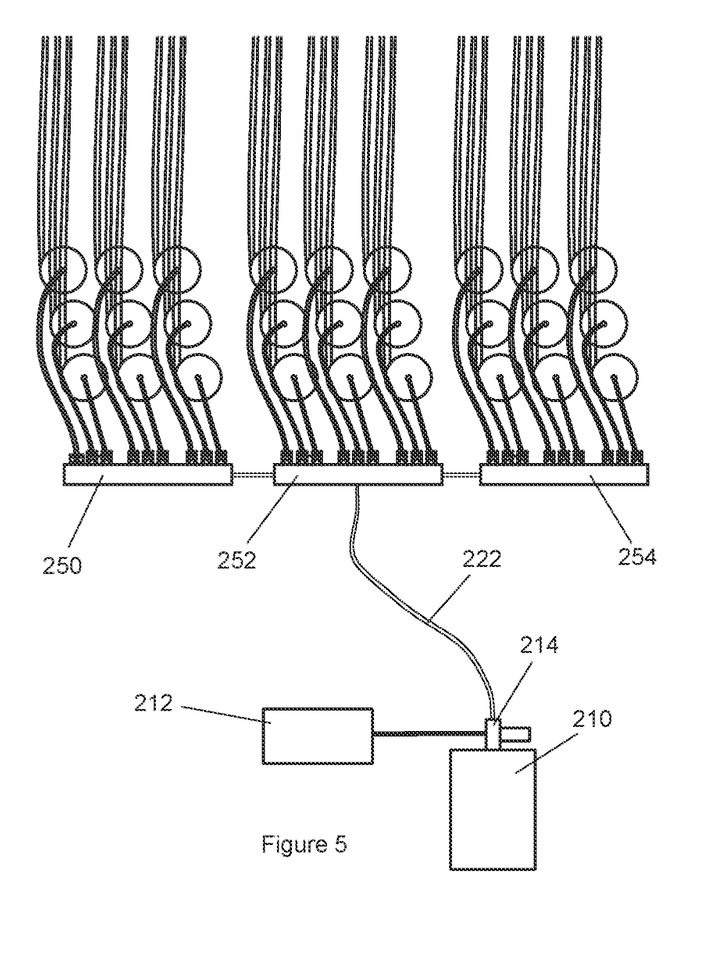
FIG. 5 depicts an alternate embodiment of a multi reel system on a three-well pad.

FIG. 5 depicts an alternate embodiment showing an air source 212 with the lubricant reservoir 210 and an inlet of high-pressure pump 214 provided with lubricant from lubricant reservoir 210. When high-pressure pump 214 is actuated the high-pressure pump 214 will supply grease or lubricant from lubricant reservoir 210 to line 222. Line 222 in turn supplies lubricant to a high-pressure manifold such as high-pressure manifold 252. High-pressure manifold 252 is fluidly connected to other high-pressure manifolds such as high-pressure manifolds 250 and 254. With grease supplied at sufficient pressure and quantity to the high-pressure manifolds the distribution of the grease to the frac valves can proceed as outlined previously.

In general, when a multi-reel system arrives at a well pad to be frac to the lubricant reservoir, the high-pressure pump, and the distribution system are located outside of the red zone. A lubricant line is unwound off of its real and attached to the frac valve that requires grease. In turn each lubricant line is unwound and attached to a frac valve on a well. Preferably the lines from a high-pressure manifold or if required multiple high-pressure manifolds are attached to a single well. Is preferable that lines from a high-pressure manifold or high-pressure manifold bank do not go to separate wells in order to allow the manifold for a well that is not being greased to be depressurized.

Figure 4:
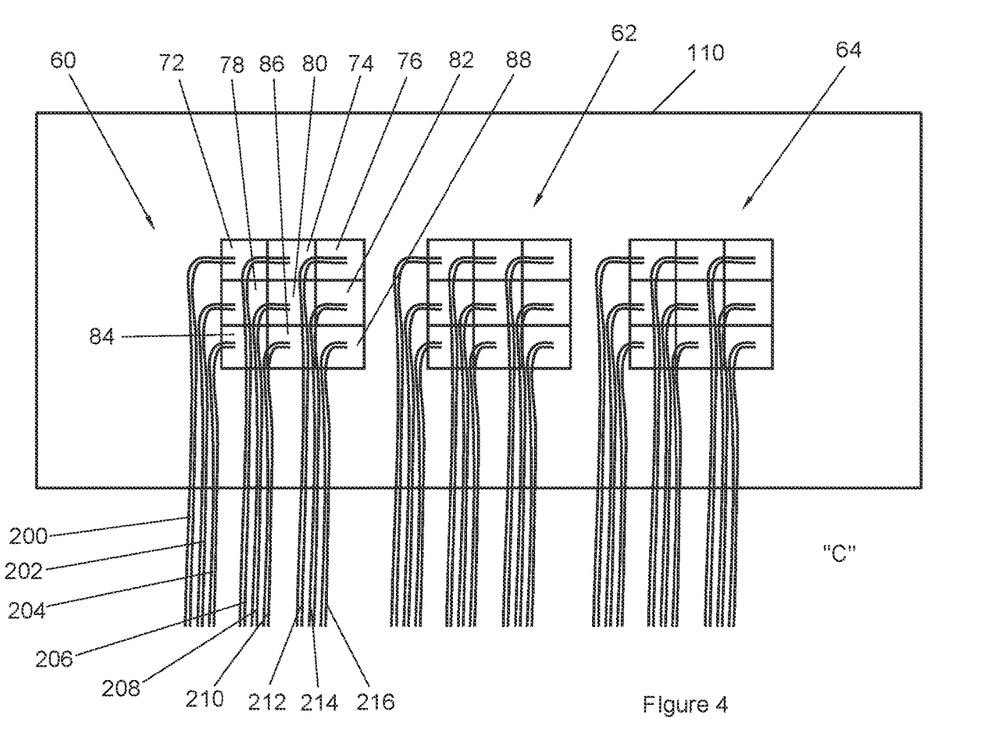
FIG. 4 depicts area "C" from FIG. 1.

Referring to FIGS. 2 through 4, with lubricant lines attached to particular frac valves and all of the distribution valves closed the system may be actuated. In this case fracking ceases on well pad 60. The operator chooses to lubricate frac valve 72 then valves 120 and 34 are commanded to open, electronically, pneumatically, hydraulically, or by an any other means. High-pressure pump 14 draws lubricant from reservoir 10 increasing the lubricants pressure to preferably about 15,000 psi as high-pressure pump 14 supplies line 22 with lubricant line 22 in turn supplies primary manifold 26 with lubricant also at about 15,000 psi. The lubricant then flows through port 28 through the now open valve 34 and into line 36. Line 36 is connected to an inlet of high-pressure manifold 50. In certain instances, primary manifold 26 may be eliminated with the high-pressure pump 14 supplying the high-pressure manifolds directly. The lubricant flows through inlet 111 and into the interior of the high-pressure manifold 50. The lubricant then flows through port 92 through the now open valve 120 and into line 144. Line 144 is connected to inlet 53 of hose reel 172 allowing lubricant to flow from line 144 into hose reel 172 and into line 200. Finally, the lubricant flows through line 200 and into the red zone 110 to finally reach frac valve 72 and providing the lubricant required. The operator may then observe flow meter 18 and deactivate pump 14 upon reaching the desired amount of lubricant or flow meter 18 may be preset to deactivate pump 14 upon reaching the desired amount of lubricant. With frac valve 72 lubricated the operator then commands valves 120 and 34 to close. With valves 120 and 34 now closed the operator proceeds to the next frac valve to be lubricated such as valve 78 in which case the operator commands valves 122 and 38 to open and repeats this process until each frac valve on wellpad 60 are lubricated. With all frac valves on well pad 60 lubricated all valves on manifold 60 are closed as are all valves on primary manifold 26. Fracking may then resume on well pad 60. Fracking may then be shut down on adjacent well pad such as 62 or 64 and the process repeated with all personnel remaining safely out of the red zone 110.

The methods and materials described as being used in a particular embodiment may be used in any other embodiment. While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A lubricant system comprising:
   a pump;
   wherein the pump is able to pump grease;
   a solid body manifold having an internal bore, one input port, and at least three output ports;
   wherein a grease moves through the manifold with a less than 10% pressure loss;
   at least three manifold output valves;
   wherein each of the manifold output valves is affixed to each of the output ports,
   a grease line affixed to each manifold output valve;
   a hose reel for storing at least a portion of each of the grease lines;
   wherein each grease line includes a connector;
   wherein the connector is suitable for connecting to a frac valve; and
   a check valve oriented to prevent backflow from the frac valves into the grease.

2. The lubricant system of claim 1, wherein the grease has a kinematic viscosity at 40° C. of between 150 and 1,600 Centistokes.

3. The lubricant system of claim 1, wherein the internal bore of the manifold is between 0.75 inches and 1.5 inches.

4. The lubricant system of claim 1, wherein the internal bore of the manifold output valves is between 0.25 inches and 0.7 inches.

5. The lubricant system of claim 1, further comprising a flowmeter.

6. A method of lubricating multiple frac valves comprising:
   connecting at least two lubricant lines between at least two lubricant line hose reels and at least two frac valves;
   wherein the at least two frac valves are inside a red zone;
   opening a valve between a high-pressure manifold and a first of the at least two lubricant line storage hose reels;
   wherein the high-pressure solid body manifold includes an internal bore, an inlet and at least three manifold output ports;

wherein each of the three manifold output ports is attached to a manifold output valve;

wherein the open valve provides a fluid path between a high-pressure pump and a first of the at least two frac valves;

actuating the high-pressure pump;

wherein the high-pressure pump supplies a lubricant at high pressure from a lubricant reservoir through the fluid path to the first of the at least two frac valves; and a check valve oriented to prevent backflow from the frac valves into the lubricant.

7. The method of lubricating multiple frac valves of claim 6 further comprising a flow meter.

8. The method of lubricating multiple frac valves of claim 6, wherein the lubricant has a kinematic viscosity at 40° C. of between 150 and 1,600 Centistokes.

9. The method of lubricating multiple frac valves of claim 6, wherein the internal bore of the manifold is between 0.75 inches and 1.5 inches.

10. The method of lubricating multiple frac valves of claim 6, wherein the internal bore of the valves is between 0.25 inches and 0.7 inches.

* * * * *